United States Patent [19]
Jiang et al.

[11] Patent Number: 5,933,336
[45] Date of Patent: Aug. 3, 1999

[54] THREE-PHASE BOOST CONVERTER HAVING MULTIPLE L-C BRANCHES AND METHOD OF OPERATION THEREOF

[75] Inventors: Yimin Jiang; Hengchun Mao, both of Plano, Tex.

[73] Assignee: Lucent Technologies Inc., Murray Hill, N.J.

[21] Appl. No.: 09/118,549

[22] Filed: Jul. 17, 1998

[51] Int. Cl.$^6$ .................................................... H02M 1/12
[52] U.S. Cl. ................................................. 363/44; 363/84
[58] Field of Search ................................... 363/39, 44, 47, 363/81, 84, 90, 148, 152; 323/222

[56] References Cited

U.S. PATENT DOCUMENTS 5,323,304  6/1994  Woodworth ............................. 363/47
5,694,310  12/1997  Malik et al. ............................. 363/84

OTHER PUBLICATIONS

Da Feng Weng, S. Yuvarajan, "Resonant Boost Input Three Phase Power Factor Corrector," 1998 IEEE, pp. 958–962.

*Primary Examiner*—Peter S. Wong
*Assistant Examiner*—Y. J. Han

[57] ABSTRACT

A boost converter having multiple L-C branches and a method of operating the same. The boost converter includes first, second and third phase inputs and an output. In one embodiment, the boost converter includes first and second switches coupled between corresponding rails of the output. The boost converter also includes first, second and third capacitors that form first, second and third L-C series branches, respectively, with a first inductor. The first, second and third L-C series branches are coupled between the first, second and third phase inputs, respectively, and a node between the first and second switches. The first and second switches cooperate progressively to employ a voltage across the rails less a voltage across the first, second and third capacitors to discharge currents through the first inductor and thereby reduce input current total harmonic distortion (THD) on all three of the phase inputs.

18 Claims, 4 Drawing Sheets

THREE-PHASE BOOST CONVERTER HAVING MULTIPLE L-C BRANCHES AND METHOD OF OPERATION THEREOF

TECHNICAL FIELD OF THE INVENTION

The present invention is directed, in general, to power conversion and, more particularly, to a three-phase boost converter having multiple L-C branches and a method of operating the same to reduce total harmonic distortion (THD).

BACKGROUND OF THE INVENTION

Over the past ten years, increasing attention has been focused on input current total harmonic distortion (THD) due to the increasing use of nonlinear loads that tend to degrade AC line quality. THD standards, such as IEC-1000.3.2 promulgated by the International Electrotechnical Commission, address input currents of, for example, 16 amperes or less per phase. Although no international standards for high power rectification exist at the present time, some countries, e.g., India and Brazil, have imposed their own requirements on input current THD to protect their AC line quality.

For producing low THD input currents in three-phase rectification, there are three different conventional approaches. The first approach utilizes six controllable power switches to actively control the three input phase currents. Separate current control loops are used to pattern each of the three input phase current waveforms, resulting in lower THD input currents. This power factor correction (PFC) approach, however, requires complex and relatively expensive control and power conversion circuitry. For example, to implement the current control loops, multiple current sensors are required to detect the input currents. Either digital signal processors (DSPs) or multiple analog controllers are required to process the information. Furthermore, the power stage requires six separate switches with independent drivers, with at least three of the drivers "floating."

The second approach to producing low THD input currents is to employ three single-phase PFC "units" to form a three-phase unit. In single-phase PFC units, input currents are controlled by the duty cycle of a power switch to follow the input voltage emulating a resistive load, which in turn, reduces the THD in the input current. If a single-phase unit has already been developed, a three-phase unit can be readily implemented. A major limitation with this approach is the relatively high cost due to the replication of control and power circuitry required to construct the three-phase unit.

A single-switch boost converter operating in discontinuous conduction mode (DCM) with a high output voltage is the third approach to reducing THD in the input currents. In this boost converter, the decay time of a boost inductor current, over a switching cycle, is determined primarily by the difference between the output DC voltage and the input voltage during the switching cycle. The greater the difference, the faster the inductor currents are reduced to zero. Consequently, the input currents' THDs are also reduced. This approach is attractive for its simplicity, higher reliability and associated lower costs. A serious limitation, however, is that the required output voltage for achieving an acceptable THD value is typically very high. The required high output voltage (for achieving low THD input currents) complicates the selection of the power switching components and the design of the successive, or cascaded load, DC/DC converters, especially when the AC input voltages are as high as 440 volts rms.

Accordingly, what is needed in the art is an improved power converter that overcomes the above-described limitations. More specifically, what is needed in the art is a power converter that has the desirable features of the above-described converters, such as simple control, simple power stage, low output voltage and low input current THD without their limitations.

SUMMARY OF THE INVENTION

To address the above-described deficiencies of the prior art, the present invention provides a boost converter and a method of operating the same. The boost converter includes first, second and third phase inputs and an output.

In one embodiment, the boost converter includes first and second switches coupled between corresponding rails of the output. The boost converter also includes first, second and third capacitors that form first, second and third L-C series branches, respectively, with a first inductor. The first, second and third L-C series branches are coupled between the first, second and third phase inputs, respectively, and a node between the first and second switches. The first and second switches cooperate progressively to employ a voltage across the rails less a voltage across the first, second and third capacitors to discharge currents through the first inductor and thereby reduce input current total harmonic distortion (THD) on all three of the phase inputs.

The boost converter therefore employs a substantial portion of the voltage across the rails, i.e., the output voltage, to increase a discharge rate of the first inductor. Consequently and in accordance with other aspects of the present invention, the boost converter achieves a lower input current THD. For the purposes of the present invention, the phrase "progressively" relates to employing a voltage across the rails less a voltage across the first, second and third capacitors to discharge currents through the first inductor. More specifically, the voltage across the rails is applied to the L-C series branches progressively rather than at the same time. The pattern of progression, however, may vary depending on the application for the boost converter.

An exemplary pattern of progression will be described with respect to one embodiment of the present invention. In this embodiment, the boost converter further includes second and third inductors. The first capacitor and the first inductor form the first L-C series branch; the second capacitor and the second inductor form the second L-C series branch; the third capacitor and the third inductor form the third L-C series branch.

Assuming that the voltage in the first phase is positive and the voltages in the second and third phases are negative, when the first switch conducts, the current through the first inductor rises in proportion to the voltage across the first capacitor. At the same time, the current in the second and third inductors is discharged by applying a substantial portion of the output voltage across the second and third inductors. In an alternative switching cycle, when the second switch conducts, a substantial portion of the output voltage is applied to the first inductor to discharge the current previously stored therein. At the same time, the current through the second and third inductors increases negatively and will be discharged during the subsequent switching cycle. Thus, in the illustrated progression, the second and third inductors in the second and third L-C series branches, respectively, are charged and discharged at the same time and the first inductor in the first L-C series branch is charged and discharged at a different time over the entire switching period. Therefore, a substantial portion of the output voltage participates in discharging the inductors, thereby providing a reduced input current THD boost converter for all three-phase inputs.

In one embodiment of the present invention, the boost inductor further includes first, second and third input inductors coupled to the first, second and third phase inputs, respectively. In a related, but alternative embodiment, the first, second and third input inductors operate in continuous conduction mode (CCM).

In one embodiment of the present invention, the boost converter further includes a rectifier interposed between the first, second and third phase inputs and the first, second and third L-C series branches. The rectifier may be a passive or active network. In an alternative embodiment, the boost converter is coupled to a regulation circuit that controls the first and second switches. The regulation circuit may include a pulse-width modulation (PWM) circuit. Those skilled in the art are familiar with rectifier and regulation circuits.

In one embodiment of the present invention, the boost converter further includes an output capacitor coupled across the first and second switches. The output capacitor filters a DC waveform at the converter output. Those skilled in the art are familiar with such filters.

In one embodiment of the present invention, the first and second switches each conduct for a duty cycle of about 50%. The duty cycle relates to the conduction period of the respective switches. In the present embodiment, the switches are controlled complementarily, with the first switch turned on for about 50% of a switching cycle and the second switch turned on during at least a substantial portion of the remaining switching cycle. The broad scope of the present invention, however, is not limited to a particular conduction interval for the switches. Also, the switches may have overlapping conduction periods, depending on the particular embodiment of the present invention and application therefor.

In one embodiment of the present invention, the first, second and third capacitors are high frequency capacitors. The average current through each capacitor over a switching cycle is small enough compared with the high frequency operating current for its voltage to stay in its designed operating region. In other words, the low frequency components of their currents are relatively small. Of course, the broad scope of the present invention is not so limited.

In one embodiment of the present invention, the boost converter further includes an electromagnetic interference (EMI) filter coupled to the first, second and third phase inputs. Those skilled in the art are familiar with EMI filters and the advantages associated therewith. The broad scope of the present invention does not require an EMI filter, however.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
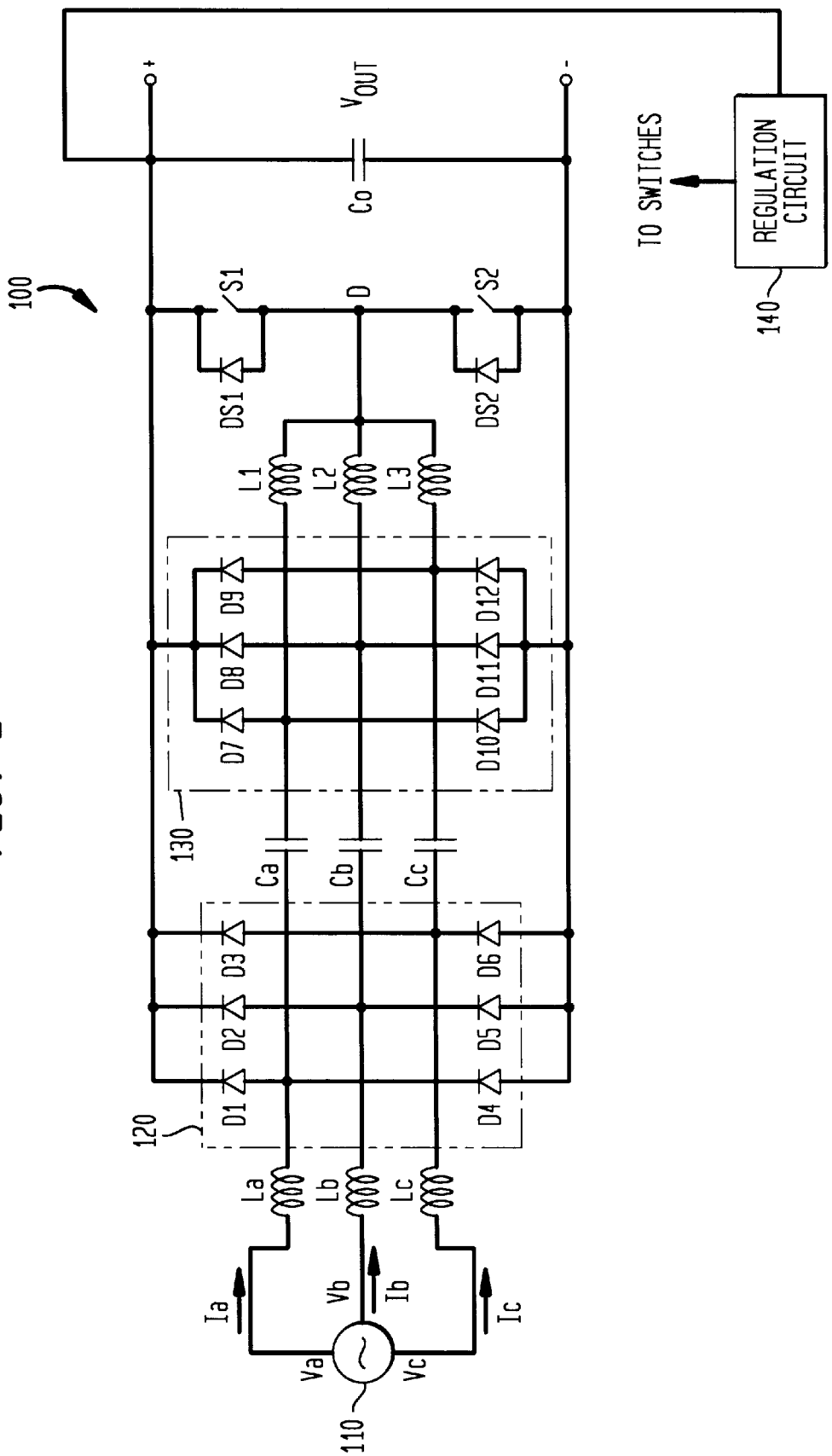
FIG. 1 illustrates a schematic diagram of an exemplary two-switch three-phase boost converter with three L-C resonant branches.

Referring initially to FIG. 1, illustrated is a schematic diagram of an exemplary two-switch three-phase boost converter 100 with three L-C resonant branches. The two-switch three-phase boost converter 100 receives input power from a three-phase AC voltage source 110 through first, second and third boost inductors La, Lb, Lc that are coupled to a three-phase rectifier 120. The three-phase rectifier 120 includes a plurality of diodes D1–D6 arranged in a full bridge configuration.

Also shown coupled to the first, second and third boost inductors La, Lb, Lc are three resonant branches (not separately referenced), each including a resonant capacitor and a resonant inductor. Specifically, the first boost inductor La is coupled to a first resonant capacitor Ca and a first resonant inductor L1, the second boost inductor Lb is coupled to a second resonant capacitor Cb and a second resonant inductor L2, and the third boost inductor Lc is coupled to a third resonant capacitor Cc and a third resonant inductor L3. A freewheeling circuit 130 that includes a plurality of diodes D7–D12 is also coupled to the three resonant branches. A common terminal of the first, second and third resonant inductors L1, L2, L3 is coupled to a node D between the first and second boost switches S1, S2. A regulation circuit 140 senses an output voltage Vout and provides gate drive signals to the first and second boost switches S1, S2. An output capacitor Co is also shown coupled across the first and second boost switches S1, S2 to filter the output DC waveform.

As the operation of the converter 100 over a switching cycle is described in greater detail below, the following assumptions and conditions apply (of course, the assumptions and conditions are not necessary to the operation of the boost converter 100).

(1) The capacitors Ca, Cb and Cc are relatively high frequency capacitors, i.e., the average current through each capacitor over a switching cycle is small enough compared with the high frequency operating current for its voltage to stay in its designed operating region. In other words, the low frequency components of their currents are relatively small.

(2) All the inductors are relatively high frequency inductors, i.e., the average volts-second applied on each inductor over a switching cycle is close to zero. In other words, the inductors do not carry low frequency voltages.

(3) Phase voltage (Va) and phase current (Ia) coupled to the first boost inductor La are greater than 0, or positive; phase voltages (Vb and Vc) and currents (Ib and Ic) coupled to the second and third boost inductors Lb, Lc are negative.

(4) The currents in the first, second and third boost inductors La, Lb, Lc are continuous.

(5) The first and second switches S1, S2 are operated complementarily with duty cycles of about 50%.

It should be noted that the following operational modes are for illustrative purposes and that the operational modes may vary with different operating conditions. Also, for the purposes of the following description and referring to FIG. 1, positive inductor current is defined as moving from left to right and capacitor voltage is defined as positive on its left terminal.

At the end of the second boost switch S2 conduction, i.e., ON, period, the first resonant capacitor Ca is charged by the input current Ia to a positive value while the second and third resonant capacitors Cb, Cc are fully discharged from negative voltages. Also, at this time, the current in the first resonant inductor L1 is positive and is equal to the current in the first boost inductor La. The current in the second resonant inductor L2 is also positive and its amplitude is determined by the resonance between the second resonant capacitor Cb and inductor L2 that occurs when the second boost switch S2 was turned ON. The current in the third resonant inductor L3 is also positive and its amplitude is determined by the resonance between the third resonant capacitor Cc and inductor L3 that occurs when the second boost switch S2 was turned ON. It should be noted that all the resonant inductors carry positive currents at this time.

MODE 1: At the beginning of this first mode, the second boost switch S2 is turned OFF and the first boost switch S1 is turned ON. Once the second boost switch S2 is OFF, the three positive resonant inductor currents force the node D to move to the top rail and the diode Ds1 conducts, allowing the first boost switch S1 to be turned ON at zero voltage. If the switches' duty-cycles are not close to 50%, however, this soft-switching condition may be lost. With the first boost switch S1 ON, the positive voltage on the first resonant capacitor Ca is applied on the first resonant inductor L1 through diode D1, driving the current in the first resonant inductor L1 from a positive value down in a resonant fashion. During this first mode, the second and third resonant inductors L2, L3 first encounter the full output voltage Vout through the first boost switch S1 and the diodes D11, D12. The second and third resonant inductors' L2, L3 currents also decrease from their positive values back to zero. During this mode, the voltages on the second and third resonant capacitors Cb, Cc remain at zero.

MODE 2: In the second mode, the resonance between the first resonant capacitor Ca and inductor L1 continues and the current in the first resonant inductor L1 continues to decrease. The currents in the second and third resonant inductors L2, L3 change to negative and begin to charge the second and third resonant capacitors Cb, Cc to negative voltages. The voltages applied on the second and third resonant inductors L2, L3 are the differences between the output voltage Vout and the voltages on the second and third resonant capacitors Cb, Cc, respectively. The currents in the second and third resonant inductors L2, L3 then increase in the negative direction. This increase is almost linear, because the voltages on the second and third resonant capacitors Cb, Cc remain small compared to the output voltage Vout.

MODE 3: In the third more, once the currents in the second and third resonant inductors L2, L3 "catch up" with the phase currents Ib and Ic, their changing rate is greatly reduced, since they are in series with the substantially larger second and third boost inductors Lb, Lc. Also during this mode, the input phase currents Ib, Ic charge their respective second and third resonant capacitors Cb, Cc to negative voltages. Concurrently, the resonance between the first resonant capacitor Ca and inductor L1 continues with the current in the first resonant inductor L1 becoming negative. The voltage on the first resonant capacitor Ca also decreases with this resonance and may reach zero if the switch ON time is longer than ¼ of the resonant period. If the voltage on the first resonant capacitor Ca reaches zero, the current in the first resonant inductor L1 freewheels through the diode D7 and the voltage on the first resonant capacitor Ca remains at zero, since both the diodes D1, D7 are conducting. At the end of this third mode, all three currents in the first, second and third resonant inductors L1, L2, L3 are negative and conduct through the first boost switch S1. Also, the voltage on the first resonant capacitor Ca is zero if fully discharged. The voltages on the second and third resonant capacitors Cb, Cc are negative, with their amplitudes determined by their corresponding phase currents.

MODE 4: In the fourth mode, the first boost switch S1 turns OFF and the second boost switch S2 turns ON. Once the first boost switch S1 is OFF, the three negative resonant inductor currents force the node D to move to the bottom rail through diode Ds2 and allow the second boost switch S2 to be turned on at zero voltage. The first resonant inductor L1 encounters the full output voltage Vout as its negative current goes through the diodes D7, Ds2. This current decreases in amplitude under the full output voltage Vout and then reverses its direction and the first resonant inductor L1 forms a series circuit with the first resonant capacitor Ca when the diode D7 stops conducting. The first resonant inductor L1 now encounters the output voltage Vout less the voltage on the first resonant capacitor Ca, and its current ramps up. Once it reaches the input phase current Ia, the diode D1 stops conducting and the full input phase current Ia flows into the first resonant capacitor Ca. Additionally, the second and third resonant capacitors Cb, Cc resonate with the second and third resonant inductors L2, L3, respectively. The currents in the second and third resonant inductors L2, L3 also increase from their negative values to positive values. If the second and third resonant capacitors Cb, Cc are fully discharged, the currents in the second and third resonant inductors L2, L3 freewheels through the diodes D11 and D12. This reaches the condition in which the above-described mode 1 is entered.

Figure 2:
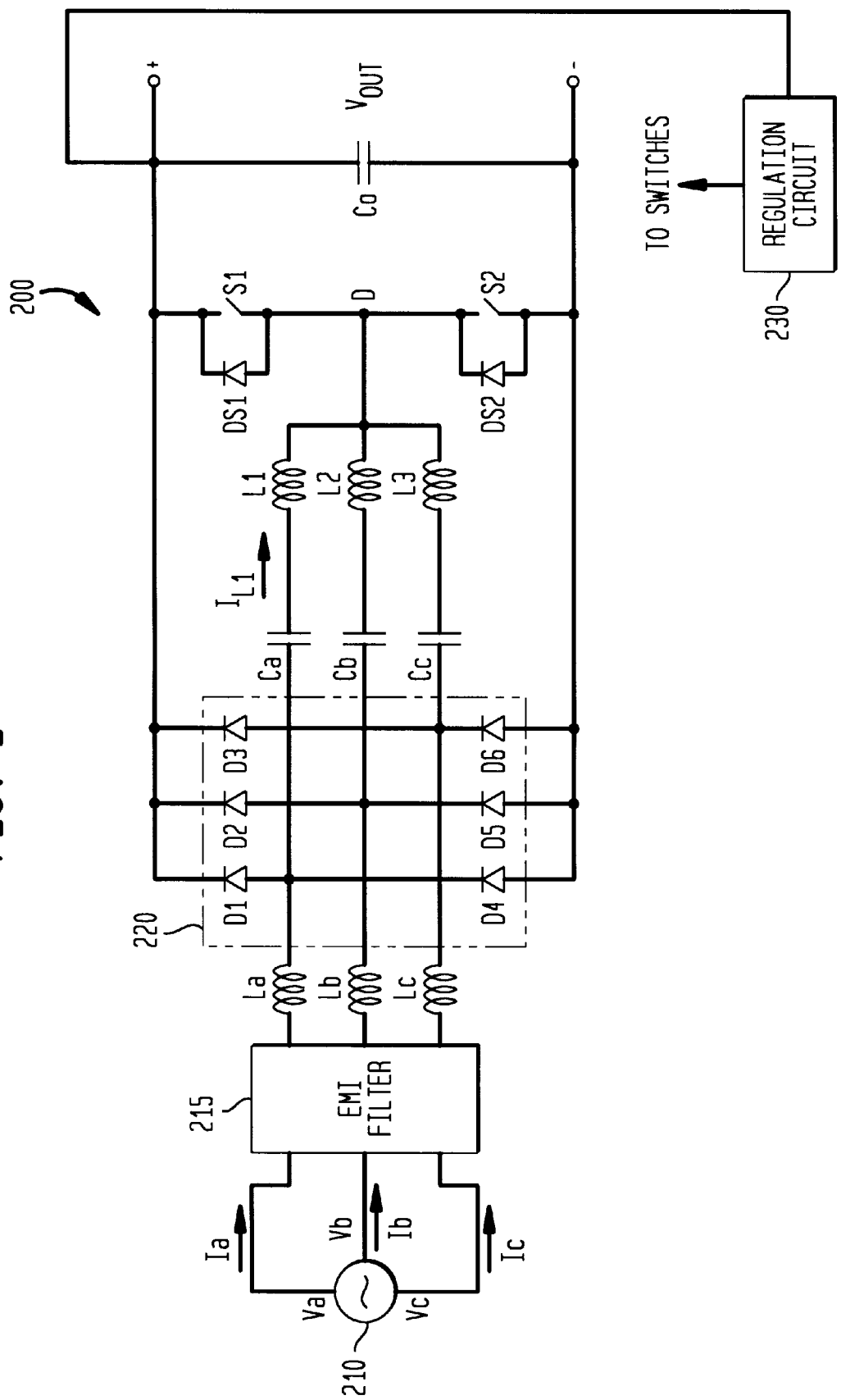
FIG. 2 illustrates a schematic diagram of an embodiment of a boost converter with three L-C series branches constructed according to the principles of the present invention.

Turning now to FIG. 2, illustrated is a schematic diagram of an embodiment of a boost converter 200 with three L-C series branches constructed according to the principles of the present invention. The converter 200 includes first, second and third boost inductors La, Lb, Lc that are coupled (via an EMI filter 215) to an AC input power source 210. It should be readily apparent to those skilled in the art that the EMI filter 215 is not necessary for the operation of the converter 200. A three-phase rectifier 220, that includes a plurality of diodes D1–D6 arranged in a full bridge configuration, is also coupled to the boost inductors La, Lb, Lc. Those skilled in the art should readily appreciate that, in other advantageous embodiments, controllable switches may be used in place of the diodes D1–D6 in the rectifier 220. The rectifier 220 rectifies the three-phase AC inputs into a DC waveform across first and second boost switches S1, S2, allowing the use of unidirectional switches to control all the three-phase AC currents. Also shown coupled to the first, second and third boost inductors La, Lb, Lc are three L-C series branches, each including a series capacitor and a series inductor. Specifically, the first boost inductor La is coupled to a first series capacitor Ca and a first series inductor L1, the second boost inductor Lb is coupled to a second series capacitor Cb and a second series inductor L2, and the third boost inductor Lc is coupled to a third series capacitor Cc and a third series inductor L3. It should be apparent to those skilled in the art that, in another advantageous embodiment, the first, second and third series inductors L1, L2, L3 may be replaced by a single inductor. A common terminal of the first, second and third series inductors L1, L2, L3 is coupled to a node, designated D, between the first and second boost switches S1, S2. Also shown in the illustrated embodiment are first and second antiparallel diodes Ds1, Ds2 that are coupled across the first and second boost switches S1, S2, respectively. The boost switches S1, S2, in an advantageous embodiment, are metal-oxide-semiconductors field effect transistors (MOSFETs) with their corresponding internal body diodes, i.e., first and second antiparallel diodes Ds1, Ds2. In another advantageous embodiment, other switching devices, such as insulated gate bipolar transistors (IGBTs), may also be advantageously employed.

The first and second boost switches S1, S2, in an advantageous embodiment, are operated complementarily with duty cycles of about 50%. It should be noted that the duty cycles of the first and second boost switches S1, S2 may be varied and may be used to control the input power level. In another advantageous embodiment, the switching frequency of the boost switches S1, S2 may be used to control the input power.

A regulation circuit 230 senses an output voltage Vout and provides gate drive signals to the first and second boost switches S1, S2. In an advantageous embodiment, the regulation circuit includes a PWM controller. Those skilled in the art are familiar with the construction and operation of PWM controllers; thus, they will not hereinafter be described in detail. An output capacitor Co is also shown coupled across the first and second boost switches S1, S2 to filter the output DC waveform.

It should noted that the capacitances of the first, second and third series capacitors Ca, Cb, Cc are sufficiently large to allow the capacitors' voltages to hold steady over a switching cycle. Also, all the inductors are high frequency inductors and do not block low frequency voltages. The voltages across the first, second and third series capacitors Ca, Cb, Cc are close to their corresponding phase-to-neutral voltages, i.e., Va, Vb and Vc, respectively. Although the first, second and third series capacitors Ca, Cb, Cc are significantly larger than their corresponding counterparts in the converter 100 of FIG. 1, the first, second and third series capacitors Ca, Cb, Cc are advantageously sufficiently small so that they do not require much low frequency current. Ultimately, the net currents through the first, second and third series capacitors Ca, Cb, Cc should be almost zero over a switching cycle.

As the first and second boost switches S1, S2 are operated in a complementary fashion, the node D moves to each output rail depending on which switch is conducting. As the node D alternates from the top to the bottom output rail, the current in each of the first, second and third series inductors L1, L2, L3 changes direction and amplitude within a switching cycle. The operation of the converter 200 is best described by referring to FIG. 3, with continuing reference to FIG. 2.

Figure 3:
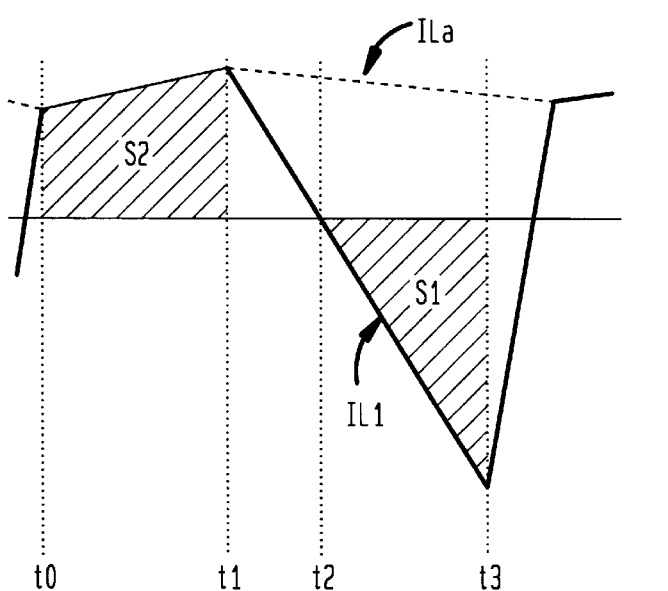
FIG. 3 illustrates exemplary current waveforms for the first boost and series inductors of the converter illustrated in FIG. 2 over a switching cycle.

Turning now to FIG. 3, illustrated are exemplary current waveforms 300 of currents ILa, IL1, over a switching cycle, through the first boost inductor La and first series inductor L1, respectively, of the converter 200 illustrated in FIG. 2. The operation of the converter 200 over an exemplary switching cycle is hereinafter described using a single phase (phase a). It should be noted that the operation of the other phases, i.e., phases b and c, are analogous to that of phase a. In describing the operation of phase a, the following initial conditions are assumed: phase a voltage and current are positive, i.e., ILa>0, Va>0, and all the input phase currents are in continuous current mode (CCM). Also, for the purposes of the following description, positive inductor current is defined as moving from left to right and capacitor voltage is defined as positive on its left terminal. Of course, the assumptions may change depending on the application.

At time t0, after the second boost switch S2 is turned ON and the current IL1 through the first series inductor L1 "catches up" with the current ILa through the first boost inductor La. Also at this time, the diode D1 of the rectifier 220 becomes reverse biased and stops conducting. The significantly slower current increasing rate of the currents IL1, ILa is dominated by the first boost inductor La, which has a significantly larger inductance than the first series inductor L1. The relatively slow rate of increase of the currents IL1, ILa continues until time t1, when the second boost switch S2 is turned OFF and the first boost switch S1 is turned ON.

When the first boost switch S1 is turned ON, the first series capacitor Ca voltage is applied to the first series inductor L1. The current IL1 through the first series inductor L1 is driven from its positive value (equal to the input current ILa) to a negative value in an almost linear fashion, because the first series capacitor Ca voltage is considered to be virtually constant over a switching cycle. The value of the current IL1 reaches its zero-crossing at time t2 and its negative peak value at time t3. At time t3, the first boost switch S1 is turned OFF. It should be noted that the negative amplitude of the current IL1 is primarily determined by the second boost switch S2 ON period, the inductance of the first series inductor L1 and the first resonant capacitor Ca voltage.

As illustrated in the current waveforms 300, a major portion of the negative current (from time t2 to t3) is proportional to the phase-to-neutral voltage Va. This is because the voltage applied to the first series inductor L1 is that of the first series capacitor Ca voltage, which is close to the phase-to-neutral voltage Va. Similarly, a relatively large portion of the positive current (from time t0 to t1) is proportional to the input phase current Ia. As stated previously, the net current through the first series capacitor Ca is advantageously almost zero over a full switching cycle. Therefore, the positive area, bounded by the current waveform for the current IL1 in FIG. 3, should equal the negative area bounded by the current waveform for the current IL1. Consequently, the input phase current Ia is roughly proportional to its corresponding phase-to-neutral voltage Va, which ultimately yields a lower THD input current. This is also true for the other two input phase currents, Ib and Ic.

Figure 4:
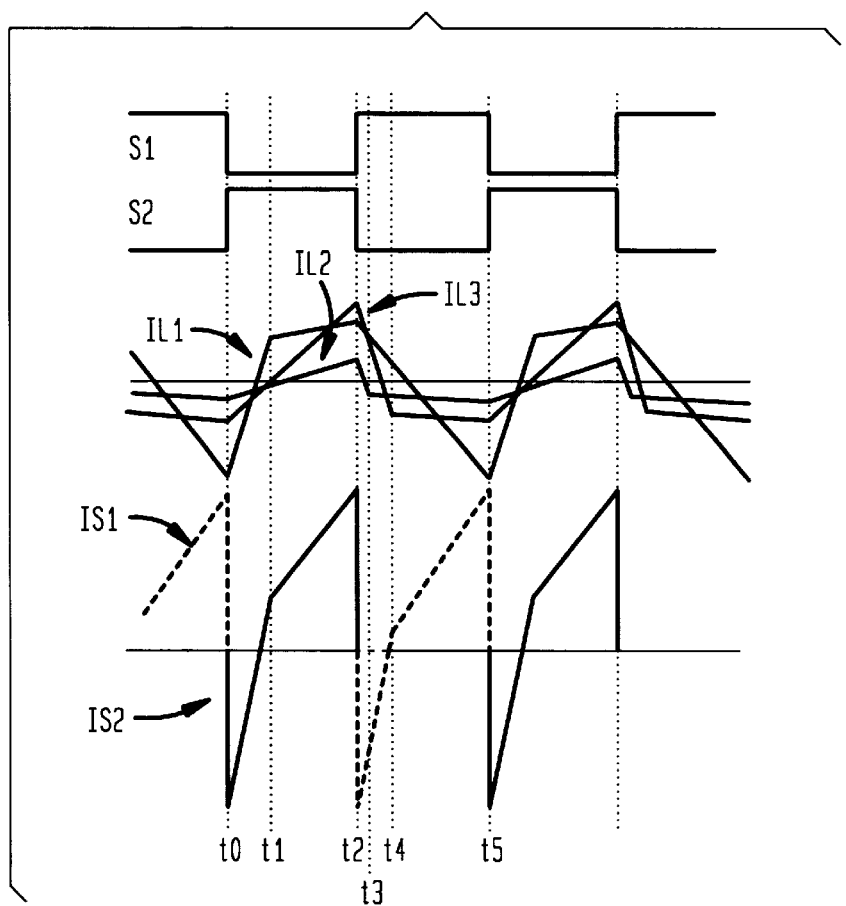
FIG. 4 illustrates exemplary drive signals and current waveforms of the first and second boost switches and the first, second and third series inductors of the converter illustrated in FIG. 2.

It should also be noted that the capacitance value of the series capacitors may vary over a wide range while still achieving lower THD input currents. In fact, the converter 200 can operate with lower THD input currents with the resonance being strong, weak or nonexistent. Further illustrations of exemplary drive signals and current waveforms of the first and second boost switches S1, S2 and the first, second and third series inductors L1, L2, L3 are shown in FIG. 4.

Figure 5:
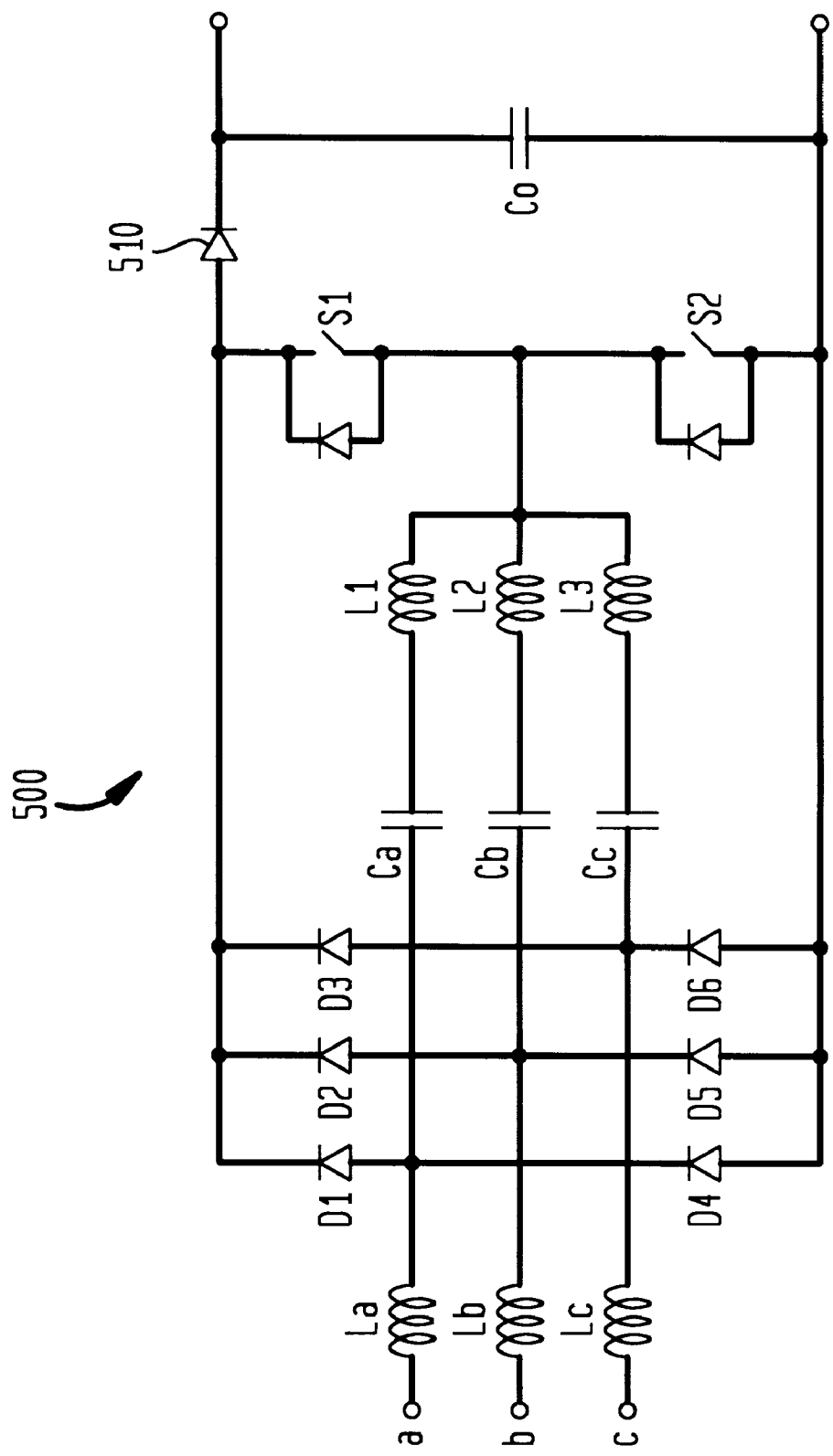
FIG. 5 illustrates a schematic diagram of another embodiment of a three-phase boost converter constructed according to the principles of the present invention.

Turning now to FIG. 5, illustrated is a schematic diagram of another embodiment of a three-phase boost converter 500 constructed according to the principles of the present invention. The boost converter 500 is similar to the boost converter 200 illustrated in FIG. 2, except for the addition of a boost diode 510 coupled between a first boost switch S1 and an output capacitor Co. The boost diode 510 allows the duty cycles of the first and second boost switches S1, S2 to be extended above 50%, thereby providing greater flexibility in the design and implementation of the switching control scheme. Additionally, the boost diode 510 increases the reliability of the boost converter 500 by eliminating the possibility of shoot-through damages when both the first and second boost switches S1, S2 are ON simultaneously.

While specific embodiments of a power converter and a THD reduction circuit and method for reducing a input current THD have been illustrated and described, other embodiments are well within the broad scope of the present invention. For a better understanding of switching power converters, in general, see "Principles of Power Electronics" by John G. Kassakian, et al., Addison Wesley, Inc. (1991), which is incorporated herein by reference.

Although the present invention and its advantages have been described in detail, those skilled in the art should understand that they can make various changes, substitutions and alterations herein without departing from the spirit and scope of the invention in its broadest form.

What is claimed is:

1. A boost converter having first, second and third phase inputs and an output, comprising:

first and second switches coupled between corresponding rails of said output;

a rectifier, coupled to said first, second and third phase inputs; and first, second and third capacitors forming first, second and third L-C series branches with first, second and third inductors, respectively said first, second and third L-C series branches coupled between said rectifier and a node between said first and second switches, said first and second switches cooperating progressively to employ a voltage across said rails reduced by a voltage across said first, second and third capacitors to discharge currents through said first, second and third inductors and thereby reduce input current total harmonic distortion (THD) on all three of said phase inputs.

2. The boost converter as recited in claim 1 further comprising first, second and third input inductors coupled to said first, second and third phase inputs, respectively.

3. The boost converter as recited in claim 2 wherein said first, second and third input inductors operable in continuous conduction mode (CCM).

4. The boost converter as recited in claim 1 further comprising an output capacitor coupled across said first and second switches.

5. The boost converter as recited in claim 1 wherein said first and second switches each conduct for a duty cycle of about 50%.

6. The boost converter as recited in claim 1 wherein said first, second and third capacitors are high frequency capacitors.

7. The boost converter as recited in claim 1 further comprising an electromagnetic interference (EMI) filter coupled to said first, second and third phase inputs.

8. The boost converter as recited in claim 1 further comprising a regulation circuit that controls said first and second switches.

9. The boost converter as recited in claim 1 further comprising a diode coupled to said output.

10. A method of operating a boost converter having first, second and third phase inputs and an output, comprising:

coupling first and second switches between corresponding rails of said output;

rectifying a voltage from said first, second and third phase inputs with a rectifier, coupled thereto;

forming first, second and third L-C series branches with first, second and third capacitors and first, second and third inductors, respectively, said first, second and third L-C series branches coupled between said rectifier and a node between said first and second switches; and controlling said first and second switches progressively to employ a voltage across said rails reduced by a voltage across said first, second and third capacitors to discharge currents through said first, second and third inductors and thereby reduce input current total harmonic distortion (THD) on all three of said phase inputs.

11. The method as recited claim 10 wherein said boost converter further comprises first, second and third input inductors coupled to said first, second and third phase inputs, respectively.

12. The method as recited in claim 11 further comprising operating said first, second and third input inductors in a continuous conduction mode (CCM).

13. The method as recited claim 10 further comprising filtering an output voltage.

14. The method as recited claim 10 further comprising inducing said first and second switches to conduct for a duty cycle of about 50%.

15. The method as recited in claim 10 wherein said first, second and third capacitors are high frequency capacitors.

16. The method as recited in claim 10 further comprising filtering electromagnetic interference (EMI) at said first, second and third phase inputs.

17. The method as recited in claim 10 wherein the act of controlling is performed by a regulation circuit.

18. The method as recited claim 10 further comprising a diode coupled to said output.

\* \* \* \* \*